United States Patent [19]

Hararat-Tehrani

[11] Patent Number: 5,201,481
[45] Date of Patent: Apr. 13, 1993

[54] DEVICE FOR INTERCEPTING AND RETAINING OF CARGO PIECES IN A CARGO HOLD

[75] Inventor: Mohammad Hararat-Tehrani, Bremen, Fed. Rep. of Germany

[73] Assignee: Deutsche Aerospace Airbus GmbH, Hamburg, Fed. Rep. of Germany

[21] Appl. No.: 802,499

[22] Filed: Dec. 5, 1991

[30] Foreign Application Priority Data

Dec. 5, 1990 [DE] Fed. Rep. of Germany ....... 4038709

[51] Int. Cl.$^5$ ............................................. B64C 1/20
[52] U.S. Cl. ................... 244/118.1; 410/121; 410/129; 410/130; 244/121
[58] Field of Search ..................... 244/118.1, 119, 121; 410/121, 122, 123, 129, 130

[56] References Cited

U.S. PATENT DOCUMENTS 4,780,034 10/1988 Skotte ................................. 410/129
4,957,250 9/1990 Hararat-Tehrani ............. 244/118.1

FOREIGN PATENT DOCUMENTS 3827281 2/1990 Fed. Rep. of Germany ...... 410/121

Primary Examiner—Joseph F. Peters, Jr.
Assistant Examiner—Anne E. Bidwell
Attorney, Agent, or Firm—W. G. Fasse

[57] ABSTRACT

A partition in the form of a device for intercepting and retaining of cargo in a cargo hold is mounted between the cargo hold and a passenger cabin. The wall structure itself has a first group of energy absorbers extending horizontally between two wall sections. The mounting structure for the retaining wall includes a second group of energy absorbing elements. The shock absorbing elements of the second group are arranged in pairs so that two elements of a pair extend in parallel to each other. The two elements of the pair are journalled at one end to a mounting block by a first cross-wise extending journal pin or shaft. The journal pin passes through the mounting block which in turn is adjustably secured to a support rail. The other ends of the energy absorbing elements of a pair are interconnected by a second journal shaft which in turn holds a mounting claw. Thus, the pair of shock absorbing elements is tiltable about the first journal axis and the mounting claw is tiltable about the second journal axis for facilitating the installation and tilting of the wall. A lower cross-bar of the wall is received in the mounting claw while another lower cross-bar of the wall is slideable on the shock absorbing elements.

6 Claims, 2 Drawing Sheets

DEVICE FOR INTERCEPTING AND RETAINING OF CARGO PIECES IN A CARGO HOLD

CROSS-REFERENCE TO RELATED APPLICATIONS

The present invention is related to the disclosure of U.S. Pat. No. 4,957,250 (Hararat-Tehrani) relating to a Device For Intercepting and Retaining of Cargo in a Transport Cabin of an Aircraft.

FIELD OF THE INVENTION

The invention relates to a device for intercepting and retaining of cargo pieces in a cargo hold, especially in an aircraft. Such devices include a retaining wall arranged either for separating a passenger cabin section from a cargo section in an aircraft or for dividing the cargo hold into several sections.

BACKGROUND INFORMATION

The above mentioned retaining walls are secured to the aircraft frame and to the cabin floor or to the floor of the cargo hold, whereby at least one support rail in the floor supports the retaining wall through energy absorbing damper elements.

German Patent (DE-PS) 3,827,281 describes a retaining wall in an aircraft, whereby the retaining wall is secured to the aircraft frame structure through damper means, including at least one damper which is constructed to mechanically take up energy, for example, by deforming, thereby converting the impact energy into heat energy. In the known construction the retaining wall is connected to the damper by means of a pivot joint and the retaining wall itself rests on the floor through a roller.

German Patent (DE-PS) 3,827,278 corresponding to the above mentioned U.S. Pat. No. 4,957,250 (Hararat-Tehrani) discloses a wall construction which is rigidly secured to the aircraft floor and through brackets to the frame structure. The retaining wall of U.S. Pat. No. 4,957,250 also comprises two wall sections spaced from each other and interconnected by friction energy absorbers.

The above described retaining wall structures, especially their means for securing these structures to the aircraft floor, leave room for improvement. More specifically, it is desirable to permit at least one wall section to move, however slightly, relative to the floor before the impact energy is introduced into the floor.

OBJECTS OF THE INVENTION

In view of the foregoing it is the aim of the invention to achieve the following objects singly or in combination:

to provide a mounting for a cargo intercepting and retaining wall in an aircraft, which mounting is easy to install and simultaneously performs an energy absorbing function;

to combine two groups of shock or energy absorbers, one group in the retaining wall itself and the other in the mounting of the retaining wall to the floor in an aircraft;

to arrange the two groups of energy absorbers in such a way that the group in the retaining wall itself becomes effective before the groups in the mounting becomes effective, so that a series effect is achieved for protecting the floor against damage; and to construct the mounting so that it is easily adjustable in its position along a support rail forming part of the floor in an aircraft.

SUMMARY OF THE INVENTION

The foregoing objects have been achieved according to the invention by an intercepting and retaining device for cargo in a space or hold, especially of an airplane, which device comprises first and second wall sections interconnected by first energy absorbers and secured to the floor by at least one mounting including a wall holding claw held to the floor by second energy absorbers. The claw holds the first wall section, while the second wall section can slide toward the first wall section and relative to the floor on a surface of the mounting at least to an extent permitted by the first energy absorbers in response to an impact.

More specifically, each mounting according to the invention comprises two individual dampers or energy absorbing elements forming the above second energy absorbers arranged in parallel to each other. One end of each of these two energy absorbing elements forming a pair is journalled by a first journal pin to a mounting block which in turn is rigidly secured to a support rail forming part of the floor. The other free ends of the energy absorbing elements are interconnected by a second journal pin which extends as a journal shaft through the wall holding claw so that the latter is also tiltable relative to the two energy absorbing elements. Preferably, the claw receives a lower edge or crossbar of the first wall section in a recess with a form-fit. The second wall section is secured to the first wall section by the first individual energy absorbers or dampers so that the second wall section can rest on the energy absorbing elements of the mounting and slide relative thereto in response to an impact.

The important advantages achieved by the invention are seen in that the retaining wall itself can take up and absorb energy by its individual dampers and that the entire wall in turn is secured to the floor by energy absorbing elements. Due to this construction the dampers in the wall can cooperate with the energy absorbing elements of the mounting, whereby the wall sections can first move toward each other before a load is introduced into the floor so that the dampers inside the wall become effective first and then the dampers in the mounting become effective. This arrangement protects the aircraft structure, especially the floor is not damaged by the mountings. Another advantage is seen in that the wall itself may be thinner than a wall, for example, according to U.S. Pat. No. 4,957,250.

Due to the tiltable mounting of the claw and of the energy absorbing elements on respective journal pins and due to the securing of the mounting block to the support rail, it is possible for the retaining wall to slightly pivot about these journal pins of its mounting in response to a crash for a better impact force distribution.

A symmetric mounting is achieved by providing two damping elements, one on each side of a mounting block, for securing the wall holding claw through the respective mounting block to the support rail which is so constructed that releasable screws permit an adjustment of the position of the energy absorbing mounting along a guide groove in the support rail. These rails extend in the longitudinal direction of the aircraft floor and a plurality of such support rails are laterally spaced from one another in a direction across the length of the aircraft. Further, it is an advantage of the invention that the retaining wall may simply be inserted with one of its lower edges into the mounting claw with a form-locking fit so that no further mounting elements are needed for securing the lower edge of the retaining wall to the floor. Conventional devices are used for securing the upper edge of the retaining wall the the aircraft frame. Special mounting devices as are, for example, needed in the above mentioned German Patent Publication 3,827,281 have thus been obviated.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
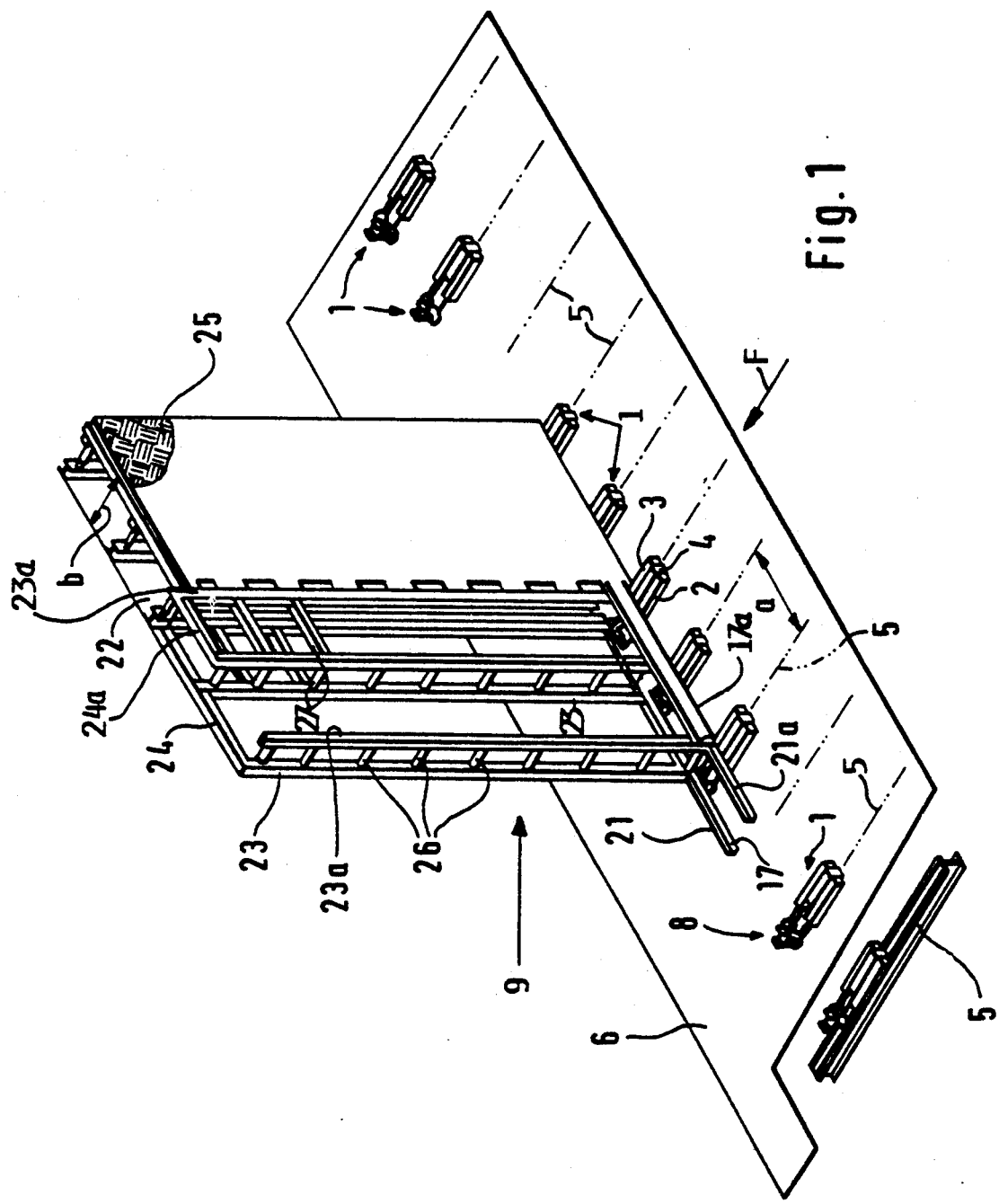
FIG. 1 is a perspective view onto a portion of the present retaining wall secured to the floor of an aircraft by a plurality of the present mounting and shock absorber devices.
Figure 2:
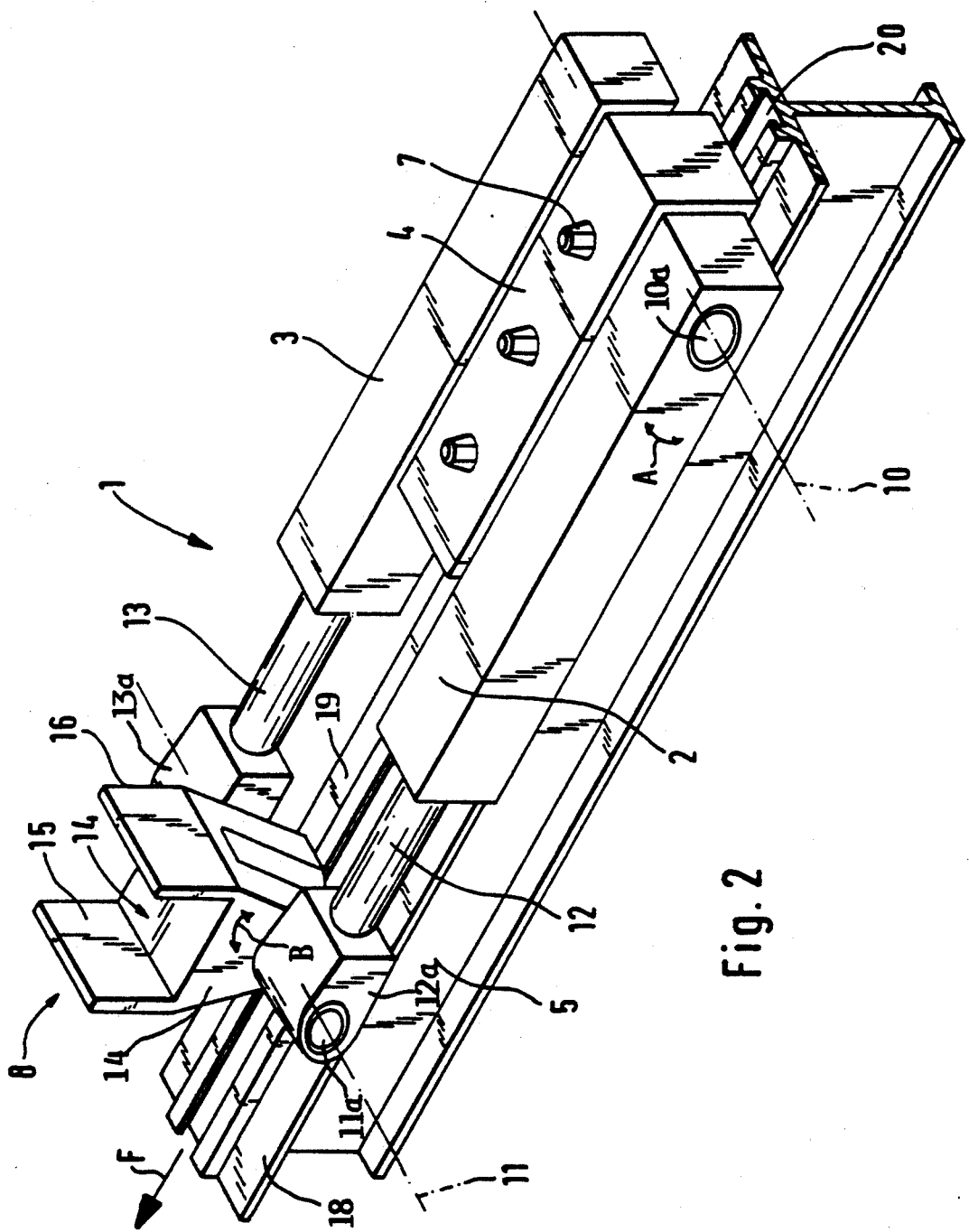
FIG. 2 is a perspective view of a mounting and its shock absorber device according to the invention.

Referring first to FIG. 2, the present mounting with its shock absorber device comprises two damping or energy absorber elements 2 and 3 arranged in parallel to each other and secured to a support rail 5 forming part of the floor 6 of an aircraft, by a mounting block 4 secured to the rail 5 by screws 7 in an adjustable manner to be described below. Neighboring mountings 1 have an on-center spacing "a" from each other as seen in FIG. 1.

The two shock absorber elements 2 and 3 forming a pair, are journalled to the mounting block 4 by a first journal pin 10a so that the shock absorbers can be tilted up and down as indicated by the double arrow A about a journal axis 10. The journal pin 10a passes through a respective bore in the mounting block 4. The shock absorber element 2 has a piston rod type plunger 12 carrying at its free end a rod head 12a. Similarly, the shock or energy absorber element 3 has a plunger type piston rod 13 with a rod head 13a at its free end. A second journal pin 11a passes through both rod heads 12a and 13a and through a wall holder claw 8 journalled on the second journal pin 11a so that the claw 8 is tiltable as indicated by the arrow B. The claw 8 has two legs 15 and 16 forming together with a claw body 14 a wall holding recess having a U-shaped cross-sectional configuration. A retainer wall 9 shown in FIG. 1 is received with its lower crossbar 21 in the recess formed between the legs 15 and 16 in a form-fit so that the wall is securely held in the recess. The absorber elements 2 and 3, or at least the rod heads 12a, 13a thereof rest on chords 18, 19 of the rail 5 and so does the body 14 of the wall holding claw 8. Thus, the rod heads 12a, 13a, and the body 14 can slide along the surface of these cords 18 and 19 in response to a crash.

As further shown in FIG. 2, the support rail 5 has a guide groove 20 in which heads, not shown, of the screws 7 are received. When the nuts on the screws 7 are tightened, the screw heads secure the mounting block 4 to the support rail 5 in the guide groove 20. For shifting the mounting and shock absorber device 1 along the length of the rail 5 as indicated by the arrow F, the nuts on the screw 7 are loosened, whereby it becomes possible to move the entire device 1 to a new position where simple tightening of the nuts will again secure the device 1 to the respective rail in a new position.

Referring to FIG. 1, the present retaining wall 9 comprises a front wall section 22 facing in the direction of the longitudinal direction arrow F toward the nose end of an aircraft, and a rear wall section 25 facing in the opposite direction toward the tail end of the aircraft. The front wall section 22 and the rear wall section 25 are spaced from each other by a spacing "b" as seen in FIG. 1. Each wall section 22 and 25 has its own frame structure. The front wall section 22 has a horizontally extending top cross-bar 24 and a horizontally extending bottom cross-bar 21. These horizontally extending cross-bars 21 and 24 are interconnected by vertical support posts 23 to form wall panels. The rear wall section 25 also has its own frame structure with a horizontal upper cross-bar 24a and a horizontal lower cross-bar 21a interconnected by vertical support posts 23a. The front wall section 22 and the rear wall section 25 are interconnected by horizontally extending conventional energy absorbers or dampers 26 which take up loads caused by a crash and convert the respective energy into heat for example by pushing a ball head through a tubular member of slightly smaller inner diameter than the outer diameter of the ball head. Such energy absorbers are known in the art.

The lower cross-bar 21 is received with a location or form-fit between the legs 15 and 16 of the claws 8 of several mounting devices 1 arranged in parallel to each other and in a row extending across the longitudinal direction F shown in FIGS. 1 and 2. The downwardly facing surface 17 of the lower cross-bar 21 rests on the surface of the body 14 and is held by the claw so that the wall is tiltable about the second journal pin 11a. Simultaneously, the lower edge 17a of the lower cross-bar 21a rests in a sliding manner on the surface of the shock absorber elements 2 and 3 without interference by the screw heads 7. Additionally, the elements 1 and 2 are tiltable about the first journal pin 10a. This provides for a certain limited movability of the retaining wall 9 in response to a crash, whereby the floor structure is substantially protected against damage because first the shock absorbers 26 become effective when an impact hits the cargo facing wall surface of the wall section 25 and the energy absorbing elements 2 and 3 only become effective after most or all of the energy absorbing capacity of the absorbers 26 has been used up. In this instance the rods 12 and 13 would be pulled or pushed with their ball heads through a tubular member of smaller inner diameter than the respective ball heads.

As mentioned, both the elements 2 and 3 of the mounting 1, as well as the dampers 26 in the wall 9, are constructed as tubular members which are widened by respective ball heads or the like that are pushed into or pulled out of these tubular members to provide a mechanical deformation and thus a mechanical energy absorption. German Patent Publications 3,827,278 and 3,827,281 disclose such energy absorbers.

Although the invention has been described with reference to specific example embodiments it will be appreciated that it is intended to cover all modifications and equivalents within the scope of the appended claims.

What I claim is:

1. A device for intercepting and retaining cargo pieces in a cargo space having a floor and a plurality of support rails arranged in parallel to one another and lengthwise on said floor, said device comprising a retaining wall for separating cargo space into two compartments, said retaining wall comprising first and second wall sections and first energy absorbing means interconnecting said first and second wall sections with each other, and a further plurality of mounting means for securing said retaining wall to said rails of said floor, each of said mounting means comprising two second energy absorbing means, a wall holding claw and a mounting block connected to a respective support rail of said support rails of said floor, said two second energy absorbing means being arranged in parallel to each other, a first journal pin for securing said two second energy absorbing means to said support rail through said mounting block, each of said two second energy absorbing means comprising an energy absorbing section and a damper rod movable with one end in said energy absorbing section, a second journal pin connecting said claw in a tiltable manner to free ends of said damper rods, whereby said claw supports said retaining wall in a tiltable manner, wherein one of said wall sections facing in a forward direction comprises a forward lower frame member (21) received in said claw (8) in a form-locking manner, and wherein the other of said wall sections facing rearwardly in said aircraft comprises a lower frame member (21a) resting on a surface of said two second energy absorbing means.

2. The device of claim 1, wherein said claw for holding said wall comprises a claw body with two legs forming a U-cross-sectional configuration for holding said lower frame member (21) of said retaining wall, said claw normally resting on on its respective support rail.

3. The device of claim 1, wherein said first mentioned plurality of support rails arranged in parallel to one another and lengthwise of said floor corresponds to said further plurality of said mounting means, and wherein said support rails and said mounting means are arranged with a spacing (a) from each other in a direction across a longitudinal direction of said floor.

4. The device of claim 1, wherein said first energy absorbing means have a length for spacing said first and second wall sections from one another by a spacing (b) lengthwise of said floor, and wherein said first and second wall sections comprise horizontal bars and vertical support posts for forming said first and second wall sections held together by said first energy absorbing means.

5. The device of claim 1, wherein each of said energy absorber damper rods comprises a rod head at its free end outside said energy absorbing section, said second journal pin passing through two of said rod heads and through said claw body held between said two rod heads, and wherein said mounting block is also positioned between said two second energy absorbing means forming a pair to provide a symmetrical structure.

6. The device of claim 5, wherein said rod heads normally rest on chords of said support rail, while still permitting a tilting motion of said claw about said second journal pin, and of said two energy absorbing means about said first journal pin.

* * * * *

UNITED STATES PATENT AND TRADEMARK OFFICE
CERTIFICATE OF CORRECTION

PATENT NO. : 5,201,481
DATED      : April 13, 1993
INVENTOR(S): Mohammad Hararat-Tehrani It is certified that error appears in the above-identified patent and that said Letters Patent is hereby corrected as shown below:

Claim 1, column 5, line 2, before "cargo" insert --said--,

Claim 2, column 5, line 31, after "said" insert --retaining--.

Signed and Sealed this

Fourth Day of January, 1994

*Attest:*

BRUCE LEHMAN

*Attesting Officer*     *Commissioner of Patents and Trademarks*